United States Patent [19]
van der Lely

[11] Patent Number: 4,616,577
[45] Date of Patent: Oct. 14, 1986

[54] SEED SOWING MACHINE WITH MONITORING SYSTEM

[76] Inventor: Cornelis van der Lely, 7, Brüschenrain, Zug, Switzerland

[21] Appl. No.: 211,186

[22] Filed: Nov. 28, 1980

Related U.S. Application Data

[63] Continuation of Ser. No. 4,540, Jan. 18, 1979, abandoned.

[30] Foreign Application Priority Data

Jan. 20, 1978 [NL] Netherlands ............................. 7800713

[51] Int. Cl.⁴ ................................................ A01C 5/00
[52] U.S. Cl. ............................................ 111/1; 221/8; 340/684
[58] Field of Search ................... 111/1, 77, 34; 221/2, 221/3, 6–8, 13, 211; 222/39, 40, 25; 361/280, 284, 281; 239/672, 673, 664; 324/71 CD; 73/861.04, 861.18, 861.73, 861.21, 861.62, 658; 340/684; 361/281

[56] References Cited

U.S. PATENT DOCUMENTS

| | | | |
|---|---|---|---|
| 3,997,063 | 12/1976 | Adams | 221/2 |
| 4,025,846 | 5/1977 | Franz et al. | 361/281 |
| 4,085,862 | 4/1978 | Steffen | 111/1 X |

Primary Examiner—James R. Feyrer
Attorney, Agent, or Firm—Penrose Lucas Albright

[57] ABSTRACT

A machine, such as a seed drill, has a conveying member for seeds or the like defining a path along which seed or other material is conveyed in discrete units during normal operations. The machine has an indication arrangement including a distance measuring instrument comprising a proximity sensor adjacent the conveying member for monitoring the pressure of material as it is moved along the path defined by the conveying member. A display panel connected to the distance measuring instrument renders occurrences comprising the movement or lack of movement of the material as sensed by the distance measuring instrument sensorially perceptible.

30 Claims, 6 Drawing Figures

SEED SOWING MACHINE WITH MONITORING SYSTEM

This is a continuation of Ser. No. 004,540, filed Jan. 18, 1979, now abandoned.

BACKGROUND OF THE INVENTION

This invention relates generally to improvements in the arrangement of sensing apparatus for materials such as seed which is distributed from agricultural implements.

The distribution of seed for agricultural purposes is usually accomplished by a tractor pulling a seed dispensing device or several such devices which extend transversely of the tractor's longitudinal axis while the seeds are continuously dispensed in furrows formed in the field. A selective seed planter is disclosed in U.S. Pat. No. 3,387,746 of June 11, 1968 to H. W. Whipple.

For maximum yield, the operator of the tractor controls the number of seeds planted per acre. This is usually accomplished by a counter device which counts the number of seeds dispensed. The counting device may be operated mechanically by the dispensing device or may constitute remote sensors of one type or another. For example, photosensitive elements are disclosed for this purpose in the patent to G. Schenkenberg, U.S. Pat. No. 3,537,091 issued Oct. 27, 1979. Ultrasonic transducer elements are used in the patent to G. G. Fathauser, U.S. Pat. No. 3,881,353, issued May 6, 1975 whereby the detecting apparatus may be operable when the seeds are received through openings of relatively large cross-section. This patent is assigned to the Dickey-John Corporation of Auburn, Ill. Other patents of interest assigned to Dickey-John Corporation include U.S. Pat. Nos. 3,881,631, 3,912,121, 4,149,163 and 4,159,064. An alarm system for blockage in the system is disclosed in U.S. Pat. No. 4,185,224 of Jan. 22, 1980 to S. L. Thompson.

Seed counters such as indicated above may have difficulty maintaining accuracy and may malfunction due to the coincidental receipt of seeds in the sensing area or with dust or moisture collecting on and near the sensors, or because of clogging in or prior to the sensing area.

This invention relates to an agricultural machine, comprising means defining a path along which, in normal operation, a material such as seeds is conveyed.

According to the present invention there is provided a machine comprising means defining a path along which, in normal operation, material is conveyed, there being also provided an indication arrangement having a distance measuring instrument, for monitoring movement of the material along said path, and a display element by which occurrences detected by the distance measuring instrument are rendered sensorily perceptible.

In an advantageous embodiment of the machine, the distance measuring instrument comprises a proximity sensor. The proximity sensor can be mounted in a simple manner at a desired location. In a further embodiment of the machine, the display element comprises a signalling lamp, preferably a light-emitting diode.

The machine may be a device for spreading material.

In a further embodiment, the path defining means comprises a dosing mechanism having a rotatable element by which the material to be spread can be conducted away from a hopper, the distance measuring instrument being arranged near the rotatable element. In this way the operation of the rotatable element forming a dosing member is checked by the indication arrangement so that a satisfactory indication of the correct distribution of the material can be obtained.

For a better understanding of the present invention and to show how it may be carried into effect, reference will now be made, by way of example only, to the accompanying drawings, in which:

DESCRIPTION OF THE PREFERRED EMBODIMENTS

Figure 1:
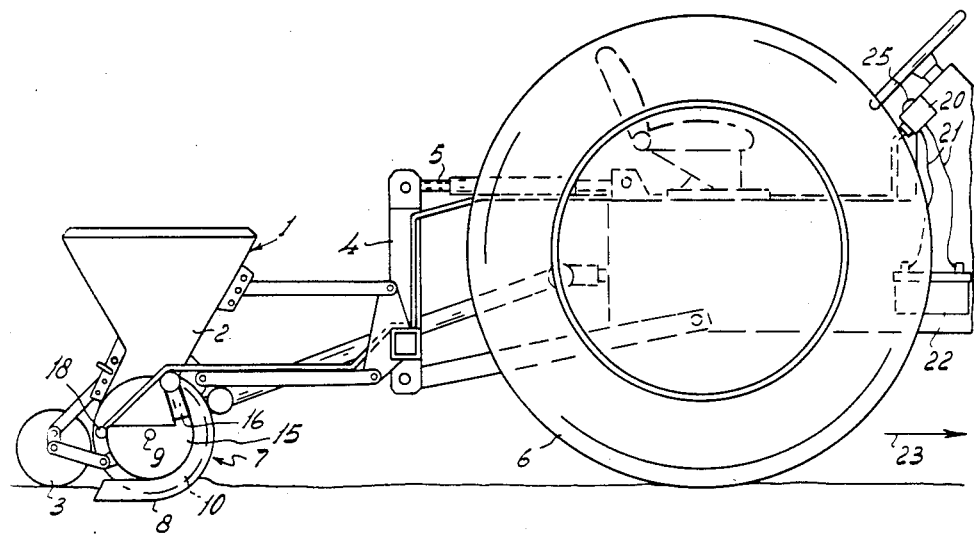
FIG. 1 is a side elevation of an agricultural machine in the form of a seed drill.

The seed drill 1 of FIG. 1 comprises a seed hopper 2 and supporting wheels 3. A frame 4 of the seed drill designated generally by reference numeral 1 comprises coupling members for attachment to lifting arms 5 of a tractor 6. Seed drill 1 has a dosing mechanism designated generally by reference numeral 7 which is shown in greater detail in FIG. 2. Beneath the dosing mechanism 7 there is a coulter 8. The dosing mechanism 7 comprises a dosing disc 10 mounted for rotation about a horizontal axis 9 which is transverse to the longitudinal axis of the tractor 6. It can be driven in rotation by means which are not shown in detail. The dosing disc 10 has apertures 11, and is in face-to-face contact with a flange 12 of a vacuum chamber 13 which communicates through a conduit 14 with a suction source, for example, the crank-case of the motor of the tractor 6. The dosing disc 10 serves as one side of a small reservoir 15, which communicates through a feed conduit 16 with the larger hopper 2. At the same vertical level as the axis 9, and at a distance 17 from the disc 10, there is a distance measuring instrument which, in this embodiment, is a proximity sensor 18. It is connected by a cable 19 to a display member in the form of a signalling box 20. The signalling box 20 is connected by leads 21 to a power source, for example, the battery 22 of the tractor 6. The signalling box 20 and the proximity sensor 18 constitute together with their connecting elements and indication arrangement.

Figure 2:
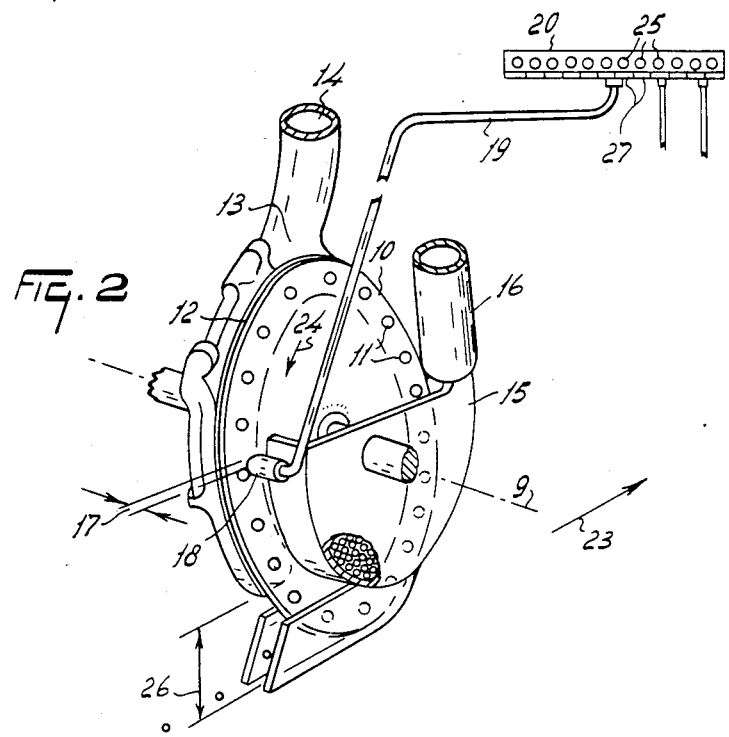
FIG. 2 is a perspective view of part of the seed drill shown in FIG. 1.

When the seed drill is operating, it is coupled with the tractor and moved by it in the direction indicated by an arrow 23. The colters 8 are pulled through the soil and the dosing mechanism delivers seed at a desired rate. In order to deliver the seed at the correct number of grains per unit of distance travelled, or per unit time or at some function of both, dosing disc 10 is rotated at an appropriate speed about the axis 9 in the direction of an arrow 24 (FIG. 2). Air is drawn out of the vacuum chamber 13 through the conduit 14 and air therefore enters the vacuum chamber 13 through the apertures 11. The disc 10 rotates past the seed reservoir 15 so that grains are drawn into the apertures 11 by the reduced pressure in the chamber 13 relative to the ambient pressure. Each of the apertures 11 thus receives a grain from the seed reservoir 15 during each revolution.

The proximity sensor 18 is located at a distance 17 from the dosing disc 10. The proximity sensor sets up an electric field through which the apertures 11 pass owing to the position of the proximity sensor 18. A grain in an aperture 11 is carried along by the disc 10 and will pass through the electric field and interrupt it. This interruption is electronically amplified, for example in the signalling box 20, and transmitted to signalling lamps 25. The signalling of the interruption may, as an alternative, be transmitted to a counter 27. After passing the proximity sensor 18, each grain carried along by the apertures 11 will move farther around until the aperture concerned no longer communicates with the vacuum chamber 13 which ends at a distance 26 above the lower edge of the disc 10. The grain is thus no longger held in the aperture 11 by suction and it will drop from the disc, between the elements of the colter 8 into the furrow made by the colter. Because the dosing disc 10 has apertures 11 at equal intervals and is rotated about the axis 9 at a constant speed, the electric field of the proximity sensor is regularly interrupted by grains carried along in the apertures 11. By controlling the amplifier, the electronic indication arrangement may be adjusted so that, in the event in a disturbance of the regular interruptions of the electric field of the proximity sensor, a signalling lamp lights to give an indication that seed is not being picked up regularly by the dosing disc 10. Near the signalling lamp, a counter may be mounted for counting the occurrences of dosing disturbances. The counter may thus provide information about the dosing operation. The counter can preferably count a number of more than four digits.

The seed drill 1 comprises several colters and dosing mechanisms as shown in FIG. 2 and preferably has a proximity sensor near each of the dosing mechanisms, each of which is connected to a respective signalling lamp of the signalling box 20. FIG. 2 shows the signalling box 20 as having a plurality of signalling lamps 25, the single dosing mechanism 7 being connected to one of these signalling lamps.

Figure 6:
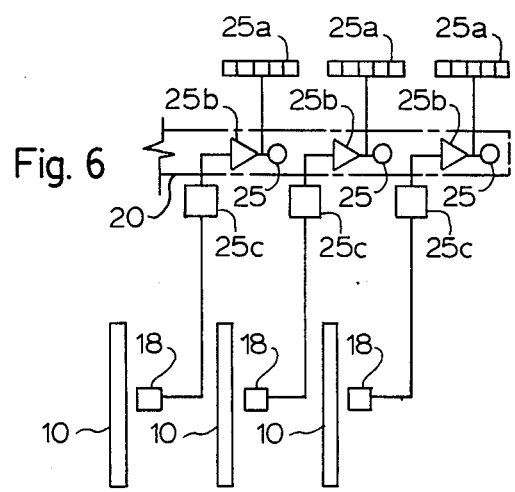
FIG. 6 diagrammatically illustrates the circuit described for the seed drill of FIGS. 1 and 2.

The interruptions of the electric fields of the proximity sensors produced by each grain are electronically amplified by amplifiers 25c illustrated in FIG. 6. If, however, the frequency of the interruptions is too high to allow a clear distinction between them, the circuitry between the proximity sensor and the signalling lamp in the signalling box may include a dividing circuits 25b each having a division factor which produces the clearest preception when the signal is applied to signalling lamps 25. Each signalling lamp 25 if preferably a light-emitting diode.

Figure 3:
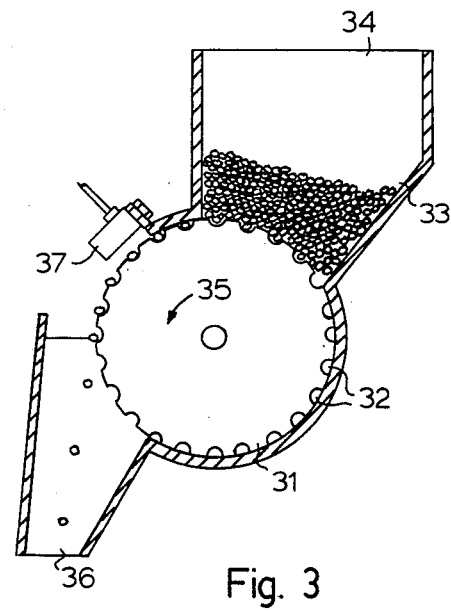
FIG. 3 illustrates schematically an alternative embodiment of the part shown in FIG. 2.

FIG. 3 shows an embodiment of a dosing mechanism which comprises a dosing drum 31 having recesses 32 at its circumference. The circumference of the drum serves as the bottom of a seed reservoir 33 supplied through a conduit 34 from the seed hopper 2 of FIG. 1. The seed drum 32 is rotated in the direction indicated by an arrow 35 by a driving system (not shown) during operation of the seed drill. Opposite the seed reservoir 33 the surface of the seed drum 31 moves past an outlet 36 communicating with a colter. During operation of the dosing mechanism shown in FIG. 3, seeds from the seed reservoir 33 enter the recesses 32 and are carried along by the drum out of the reservoir 33. Near the top of the seed drum there is a proximity sensor 37 which corresponds with the proximity sensor 18. During rotation of the seed drum, the recesses 32 with a seed (or other material to be sown or distributed) will pass the sensor 37. Since the outlet 36 is located near the lower part of the drum, the seeds will drop out of the recesses 32 into the outlet 36 and be delivered into the soil. The proximity sensor 37 is adjusted so that its electric field is constantly interrupted by the circumference of the drum. When a recess 32 filled with a seed or other material to be sown or planted passes by the proximity sensor, the electric field will be disturbed. If the recess is not filled, the electric field is not disturbed, and if this happens a signal is transmitted to a signalling lamp in a signalling box, which co-operates with the drum 31. The signalling lamp, normally not lighted, then lights. If the lamp is constantly lighting, it indicates an undesirable disturbance of the operation of the dosing mechanism so that measures are needed to prevent irregular distribution.

The signalling box 20 is preferably disposed near the instrument panel of the tractor so that the tractor driver can constantly watch it. The signalling box is preferably arranged on the tractor in a detachable manner so that when the machine 1 is disengaged from the tractor the signalling box can be removed from the tractor and transported and kept with the machine.

Figure 4:
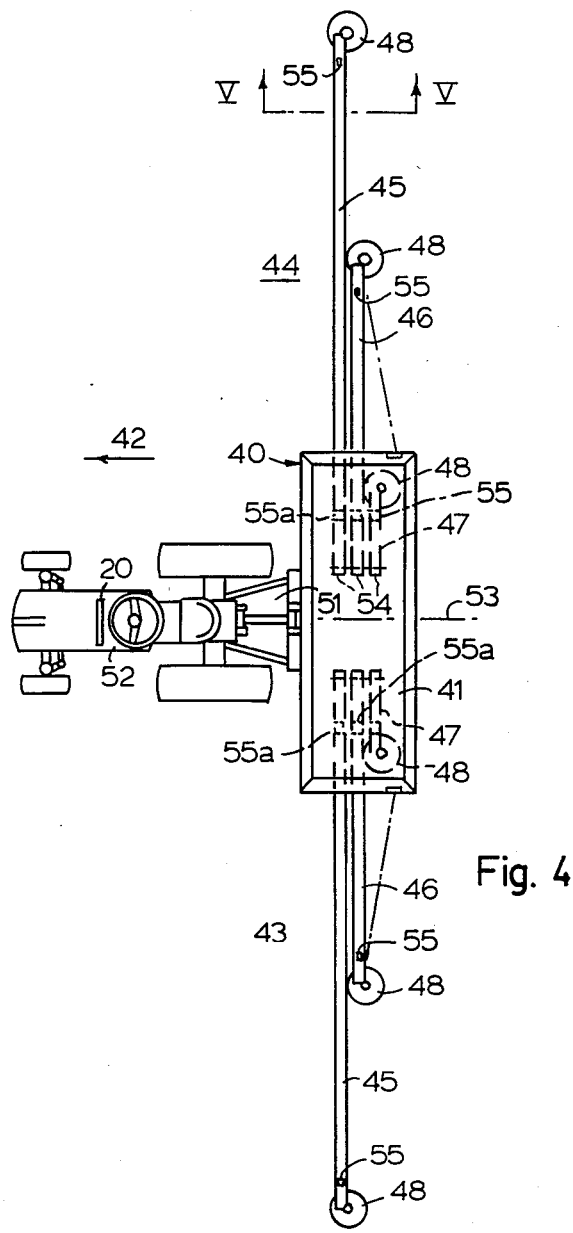
FIG. 4 is a plan view of an agricultural machine in the form of a distributor.
Figure 5:
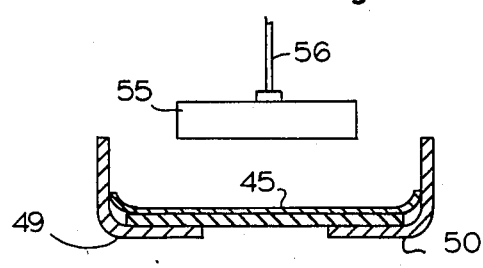
FIG. 5 is an enlarged sectional view taken along the line V—V in FIG. 4.

FIGS. 4 and 5 show an agricultural machine constituted by a distributor designated generally by reference numeral 40 which comprises a hopper 41 on either side of which there are spreading members 43 and 44 extending transversely of the intended direction of operative travel as indicated by arrow 42. Each of the spreading members 43 and 44 comprises three conveyors, such as conveyor belts 45, 46 and 47 extending for different distances in each lateral direction (see FIG. 4). Near the end of each conveyor belt 45, 46 and 47, there is a spreading member 48 which is mounted for rotation about an upwardly extending axis. Each of the belts, as is shown in detail in FIG. 5, is arranged in channel constructed of two angular supports 49 and 50. The distributor is attached to the lifting arms 51 of a tractor 52. The ends 54 of the conveyor belts 45 to 47 located near the longidudinal axis 53 co-operate with a delivery and dosing mechanism (not shown) of the hopper 41. Near the outer end of each of the conveyor belts 45, 46 and 47 there is a proximity sensor 55, one of these being shown in detail in FIG. 5. Each of the proximity sensors is connected by a cable 56 to a signalling box (not shown) with signalling lamps or counters or both corresponding with the signalling box 20 of FIG. 2.

When the distributor is used, it travels in the direction of the arrow 42 across a field. During this movement material is supplied from the hopper to the belts 45, 46 and 47 of the spreading members 43 and 44 at a rate appropriate to the desired spreading rate per unit of travel or per unit time or a function of both. Dependent upon the quantity of material to be distrubuted per unit time or per unit of travel or both, an appropriate thickness of the material to be spread is deposited on the belts 45 to 47. The proximity sensor above each belt 45 to 47 is adjusted so that when the correct thickness of the layer is on the conveyor belt it does not emit an interference signal to the relevant signalling lamp in the signalling box 20. However, if some disturbance causes no material to be transported on any one of the belts, for example the belt 45, the proximity sensor 55 will transmit a signal corresponding to such absence to the relevant signalling lamp in the signalling box so that the driver is informed about the disturbance of the feed to one of the spreading members 48. The proximity sensors 55 may be vertically adjustable so that they can be set at a vertical height as selected in dependence upon the desired thickness of the layer of material on the conveyor belt. If some disturbance causes the thickness of the layer of material to vary from the desired thickness, the proximity sensor will signal this event to the signalling box so that the signalling lamp 25 concerned will light.

Proximity sensors may, in some cases, be provided only near the outer ends of the conveyor belts of each of the spreading members 43, 44. In the embodiment shown in FIG. 4 signalling lamps in a signalling box 20 are connected to the proximity sensors above each of the six conveyor belts. However, particularly for the longer conveyor belts 45 and 46, it may be desirable to provide an additional proximity contact near the region where the material is fed from the hopper to the belts. The belts 45 and 46 may therefore be provided with proximity sensors 55a. These sensors 55a may be set in the same manner as the proximity sensors 55. If, with a longer conveyor belt, two proximity sensors are provided, one near the beginning and one near the end of the belts, it can be observed in the event of a disturbance whether only one, or both, of the two proximity sensors of the conveyor belt, for example sensors 55 and 55a above the conveyor belt 45, produce an interference signal. If, for example, only the sensor 55 provides a disturbance-induced signal it follows that the disturbance is occurring somewhere along the conveyor belt rather than at the feed end of the conveyor belt, for example as a result of clogging on the conveyor belt causing the material to spill over the rims of the conveyor belt. A disturbance occurring in the delivery from the hopper to the conveyor belt 45 can be diagnosed because first the proximity sensor 55A and later the proximity sensor 55 will provide a disturbance-induced signal.

The signalling box 20 will comprise a number of signalling lamps equal to the number of proximity sensors above the conveyor belts. In the embodiment shown in FIGS. 4 and 5, as with the embodiments of FIGS. 1 to 3, the signalling box 20 can be mounted detachably on the tractor whereby it can be disengaged from the tractor when the distributor 40 is uncoupled.

Although various features of the machines described and illustrated in the drawings will be set forth in the following claims as inventive features, it is to be understood that the invention is not necessarily limited to those features and may encompass other features the are disclosed both individually and in various combinations.

I claim:

1. Apparatus for monitoring material distributed by an agricultural machine, the apparatus comprising material transporting means, curved path defining means for the material including in said transporting means, means for separating said material into discrete units and spacing same an equal distance apart while such units are being moved along said path by said transporting means, an instrument mounted closely adjacent and entirely on one side of said path which includes means for producing an electric field and separately sensing the presence of each said discrete unit in at least a portion of said path while directly supported by said transporting means by its proximity to said field producing means whereby said field is interrupted in reaction to each said unit, a display element connected to said instrument registering said presence in response to said field interruption.

2. Apparatus according to claim 1, wherein said path defining means comprises a rotatable disc having a plurality of aperatures for receiving said material, said proximity sensing means being arranged to sense the presence of said material sequentially in each of said apertures.

3. Apparatus according to claim 2, wherein said disc rotates about a horizontal axis and is adapted to be received on the lower part of its periphery under the surface of the soil and deliver said material in such part into the soil under its surface.

4. Apparatus according to claim 3, wherein said disc's lower part is associated with colter means.

5. Apparatus for monitoring material distributed by an agricultural implement which comprises means for holding said material, means for distributing said material received from said holding means and material transporting means including arcuate path defining means for moving said material from said holding means to said distributing means, said material transporting means including means for separating said material into discrete parts while thereon whereby said material is for at least part of its movement from said holding means to said distributing means and while supported by said transporting means separated into substantially equal discrete parts which are spaced an equal distance apart, a proximity sensor which projects an electric field and is adapted to sense the presence of each said discrete part by the interruptions of said electric field being mounted closely adjacent to said path on one side thereof only where said material is separated into discrete parts, on said transporting means and a display element connected to said sensor for registering said presence responsive to the interruptions of said electric field by said discrete parts.

6. Apparatus according to claim 5, wherein separation means comprising recesses separates said material into substantially numerical equal parts.

7. Apparatus according to claim 6, wherein said recesses are apertures and each of said discrete parts consists of one seed.

8. An agricultural machine comprising a holding member for material, means for transporting material from said holding member defining a plurality of arcuate, material paths along each of which, in normal operation, said material is conveyed by said transporting means from said holding member in discrete units spaced an equal distance apart, there being provided closely adjacent on one side only of each said path an indication arrangement which includes a proximity sensor which projects an electric field proximate said path for sensing the presence of said material discrete units supported on said transporting means along said path by their interruptions of said electric field as moved along said path and a display element for each said path by which occurrences detected by the distance measuring instrument are rendered sensorially perceptible to the machine's operator whereby the operative functions of each said transporting means is communicated separately to the operator.

9. A machine as claimed in claim 8, in which said proximity sensor is connected through an amplifier to said display element.

10. A machine as claimed in claim 9, in which said display element comprises a signalling lamp.

11. A machine as claimed in claim 10, in which said signalling light comprises a light-emitting diode.

12. A machine as claimed in claim 9, in which between said proximity sensor and said display element, there is a dividing circuit having such a division factor which provides a clearly perceivable signal.

13. A machine as claimed in claim 9, in which said display element comprises a counter.

14. A machine as claimed in claim 13, in which said counter has a capacity to display a number having more than four digits.

15. A machine as claimed in claim 9, in which said display element comprises a display of light emitting means.

16. A machine as claimed in claim 9, in which said display element is connected by a cable to the rest of the indication arrangement whereby said display element is displaceable with respect to the rest of the indication arrangement.

17. A machine as claimed in claim 9, in which means are provided for attaching the machine to the lifting device of a tractor or the like with said display element adapted to be mounted releasably on said tractor or like vehicle.

18. A machine as claimed in claim 9 comprising a plurality of material path defining means and display elements wherein there are a plurality of further similar proximity sensors each of which is proximate a respective path defining means and connected to a respective display element.

19. A machine as claimed in claim 18, in which the number of said proximity sensors, the number of said display elements, and the number of said path defining means along which material is conveyed during normal operation are the same, one said proximity sensor being provided for each path.

20. A machine as claimed in claim 9, in which said means defining the path for conveying the material comprises a device for distributing the material directly into the soil without falling an appreciable distance.

21. A machine as claimed in claim 20, in which said device is a seed drill.

22. A machine in accordance with claim 21 comprising a colter which receives material comprising seeds from said transporting means and delivers said seeds under the soil.

23. A machine as claimed in claim 20, in which said distributing device comprises a hopper and a dosing mechanism having a rotatable element for conveying the material to be distributed from said hopper, said proximity sensor being disposed near said rotatable element.

24. A machine as claimed in claim 23, in which said proximity sensor is disposed near said rotatable element at a location where it delivers the material to be distributed.

25. A machine as claimed in claim 24 in which said distributing device comprises suction means and said rotatable element has a plurality of apertures, said apertures being disposed for communication with said suction means, said proximity sensor being disposed at the side of said rotatable element away from said suction means.

26. A machine as claimed in claim 25, in which said dosing mechanism comprises an upwardly disposed rotatable disc, said proximity sensor being disposed on the side of said disc adjacent the path of movement of said apertures during operation of the machine.

27. A machine as claimed in claim 23 including a hopper and in which a dosing mechanism is provided which comprises a rotatable delivery element having recesses for metering the material to be distributed from said hopper, said recesses being provided in the periphery of said dosing member, said proximity sensor being disposed outside the circumference of said delivery element.

28. A machine as claimed in claim 23, in which a guide path is defined, along which the material is conveyed for distrubution, said proximity sensor being disposed adjacent said guide path.

29. A machine as claimed in claim 8, in which said distance measuring instrument is provided only on lateral one side of each said path.

30. A machine as claimed in claim 8 in which said distance measuring instrument comprises a proximity sensor which is spaced adjacent to and immediately over said path along which the material is conveyed.

* * * * *